US009494096B2

(12) United States Patent
Pfaffinger

(10) Patent No.: US 9,494,096 B2
(45) Date of Patent: Nov. 15, 2016

(54) METHOD AND APPARATUS FOR DETERMINING THE EFFICIENCY OF AN EXHAUST GAS PURIFICATION DEVICE

(71) Applicant: MAN Truck & Bus AG, Munich (DE)

(72) Inventor: Andreas Pfaffinger, Neumarkt (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/336,347

(22) Filed: Jul. 21, 2014

(65) Prior Publication Data

US 2015/0033706 A1 Feb. 5, 2015

(30) Foreign Application Priority Data

Jul. 30, 2013 (DE) .......................... 10 2013 012 575

(51) Int. Cl.
*F01N 11/00* (2006.01)
*F02D 41/14* (2006.01)
(Continued)

(52) U.S. Cl.
CPC ............ *F02D 41/1463* (2013.01); *F01N 3/035* (2013.01); *F01N 3/103* (2013.01); *F01N 3/106* (2013.01); *F01N 3/208* (2013.01); *F01N 3/2066* (2013.01); *F01N 11/00* (2013.01); *F01N 11/007* (2013.01); *F01N 13/009* (2014.06); *F01N 3/0231* (2013.01); *F01N 2550/02* (2013.01); *F01N 2560/026* (2013.01); *F01N 2560/14* (2013.01); *F01N 2570/14* (2013.01); *F01N 2570/18* (2013.01); *F01N 2610/02* (2013.01); *F01N 2900/0402* (2013.01); *F01N 2900/0408* (2013.01); *F01N 2900/0412* (2013.01);

(Continued)

(58) Field of Classification Search
CPC ...... F01N 3/0231; F01N 3/035; F01N 3/106; F01N 3/208; F01N 13/009; F01N 2550/02; F01N 2560/026; F01N 2560/14; F01N 2570/18; F01N 2610/02; F01N 2900/0402; F01N 2900/0412; F01N 2900/1402; F01N 2900/1612; F01N 2900/1621
USPC ......... 60/274, 276, 277, 286, 295, 297, 301, 60/311
See application file for complete search history.

(56) References Cited

U.S. PATENT DOCUMENTS

2009/0158813 A1* 6/2009 Bartley ....................... 73/23.31
2010/0319316 A1* 12/2010 Kasahara ..................... 60/273
(Continued)

FOREIGN PATENT DOCUMENTS

DE   10 2011 101 174 A1   2/2012
WO   2010097292 A1        9/2010

*Primary Examiner* — Jorge Leon, Jr.
(74) *Attorney, Agent, or Firm* — Lucas & Mercanti, LLP

(57) ABSTRACT

A method for determining the efficiency of an exhaust gas purification device of a diesel internal combustion engine for motor vehicles, having a first NOx sensor, arranged ahead of an oxidation catalyst and/or a particulate filter, and a second NOx sensor, arranged downstream of a reduction catalyst, and having a device for the metered supply of a reducing agent, wherein the method includes feeding the signals from the two NOx sensors are fed to a control unit, by means of which at least one feed quantity of the reducing agent is specified. To determine an efficiency of the oxidation catalyst and/or of the particulate filter, the NO and NO2 concentration and/or the NO2/NO ratio of the exhaust gas flow at the measurement position of the second NOx sensor and/or downstream of the reduction catalyst is determined by the control unit solely of the signal values acquired by the two NOx sensors.

20 Claims, 1 Drawing Sheet

(51) Int. Cl.
  *F01N 3/035* (2006.01)
  *F01N 3/20* (2006.01)
  *F01N 3/10* (2006.01)
  *F01N 13/00* (2010.01)
  *F01N 3/023* (2006.01)

(52) U.S. Cl.
  CPC .............. *F01N2900/1402* (2013.01); *F01N 2900/1621* (2013.01); *Y02T 10/24* (2013.01); *Y02T 10/47* (2013.01)

(56) References Cited

U.S. PATENT DOCUMENTS

| | | | |
|---|---|---|---|
| 2011/0030350 A1* | 2/2011 | Kato | 60/286 |
| 2011/0126517 A1* | 6/2011 | Miyoshi et al. | 60/274 |
| 2011/0257899 A1* | 10/2011 | Zanetti et al. | 702/24 |
| 2012/0006002 A1* | 1/2012 | Hagimoto et al. | 60/274 |
| 2014/0065041 A1* | 3/2014 | Szailer et al. | 423/212 |

* cited by examiner

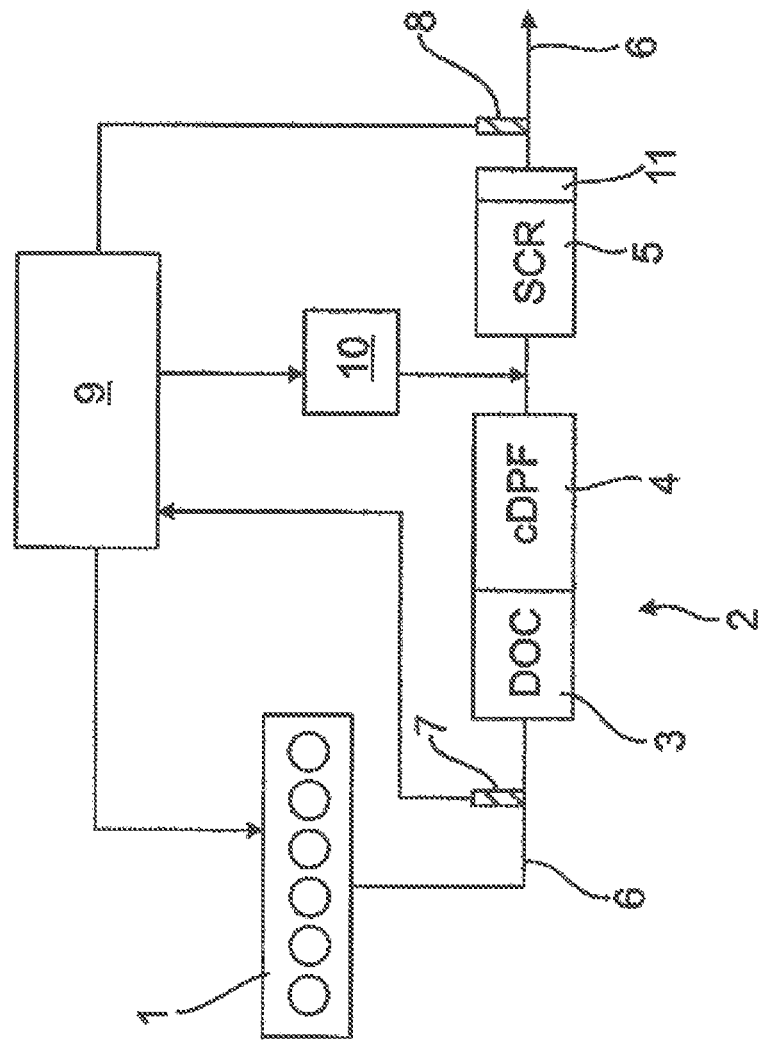

METHOD AND APPARATUS FOR DETERMINING THE EFFICIENCY OF AN EXHAUST GAS PURIFICATION DEVICE

CROSS-REFERENCE TO RELATED APPLICATIONS

This application claims the priority of DE 10 2013 012 575.8 filed Jul. 30, 2013, which is incorporated by reference herein.

BACKGROUND OF THE INVENTION

The present invention relates to a method for determining the efficiency of an exhaust gas purification device of an internal combustion engine, in particular of a diesel internal combustion engine for motor vehicles, and to an apparatus for determining the efficiency of an exhaust gas purification device of an internal combustion engine, in particular a diesel internal combustion engine for motor vehicles.

Exhaust gas purification devices of the type in question for diesel internal combustion engines, in particular in motor vehicles use two NOx sensors for system control and monitoring, one of which is arranged upstream of an oxidation catalyst and the second is arranged downstream of a reduction catalyst and the signal values of which allow conclusions to be drawn on the NO, NO2 and NH3 concentrations in the exhaust gas.

It is known that the conversion rate of oxidation catalysts and/or of particulate filters can decrease due to ageing or, where relevant, due to sulphur contamination (in the case of unsuitable fuels), wherein monitoring of this decrease would be advantageous for the purpose of specifying component replacement or for the adaptation of control unit characteristic values, curves or maps in an electronic engine control unit.

DE 10 2011 101 174 A1 discloses arranging a first NOx sensor upstream of an oxidation catalyst, a second NOx sensor downstream of a particulate filter arranged after the oxidation catalyst, and a third NOx sensor downstream of an SCR catalyst arranged after the particulate filter. The first and second NOx sensors, which are each arranged upstream of the SCR catalyst, have an NO2 cross sensitivity in order to determine the NO/NO2 concentration in the exhaust gas without being impaired by the downstream supply of reducing agent. By comparing the signal values of the two NOx sensors in an electronic control unit, it is possible to infer a reduced conversion rate of the oxidation catalyst and/or of the particulate filter and, if appropriate, to generate a fault signal. In contrast, the third NOx sensor, which is arranged downstream of the SCR catalyst, should have only an NH3 cross sensitivity in order to be able to detect a reducing agent breakthrough. The outlay on components is relatively high here, as is the outlay on evaluation.

WO 2010/097292 A1 describes another method for estimating the effectiveness of an oxidation catalyst, which manages without measuring probes or NOx sensors on the oxidation catalyst and, for this purpose, measures the effectiveness or temperature spectrum of the reduction catalyst by means of a temperature sensor and evaluates it in a characteristic-curve memory. The temperature spectrum in the SCR catalyst may shift upwards as the conversion rate of the oxidation catalyst decreases, for example.

SUMMARY OF THE INVENTION

It is an object of the invention to provide a method and an apparatus for determining the efficiency of an exhaust gas purification device of an internal combustion engine, in particular a diesel internal combustion engine for motor vehicles, by means of which efficiency determination can be carried out in a manner which involves less outlay in terms of components but is nevertheless dependable and functionally reliable, in particular for an oxidation catalyst and/or a particulate filter and/or for an ammonia slip catalyst arranged after a reduction catalyst.

A method for determining the efficiency of an exhaust gas purification device of an internal combustion engine, in particular of a diesel internal combustion engine, in particular for motor vehicles, is proposed, which uses a first NOx sensor arranged ahead of an oxidation catalyst and/or of a particulate filter, a second NOx sensor arranged downstream of a reduction catalyst, and a device for the metered supply of a reducing agent, in particular an aqueous urea solution, wherein the signals from the two NOx sensors are fed to an electronic control unit, by means of which at least one feed quantity of the reducing agent is specified. According to the invention an efficiency, in particular an NO2 formation efficiency, of at least the oxidation catalyst and/or of at least the particulate filter is determined by determining the NO and NO2 concentration or at least the NO2/NO ratio of the exhaust gas flow at the measurement position or in the region of the measurement position of the second NOx sensor and/or downstream of the reduction catalyst by the control unit solely by the signal values acquired by the two NOx sensors, which are, in particular, NOx signal values. For the preferred case that an ammonia slip catalyst is arranged after the reduction catalyst, the NO and NO2 concentration or at least the NO2/NO ratio of the exhaust gas flow in the region of the measurement position of the second NOx sensor and/or downstream of the ammonia slip catalyst is determined by the control unit solely by the signal values acquired by the two NOx sensors, which are, in particular, NOx signal values. The values determined in this way are in this case preferably compared with one another and/or with specified desired values to determine the efficiency, in particular the NO2 formation efficiency, of the oxidation catalyst and/or of the particulate filter and/or of the ammonia slip catalyst.

By means of such a solution, the second NOx sensor or the NO2 cross sensitivity thereof, which is present in any case, can be used in a dual function for efficiency determination, significantly reducing the outlay on construction. A significant difference with respect to the subject matter of DE 10 2011 101 174 A1, mentioned at the outset, is that no third NOx sensor and the associated outlay on control and evaluation are employed. Thus, this allows a simple and functionally reliable way, without additional outlay on construction, of acquiring the signal values of the two NOx sensors in the electronic control unit and of evaluating them for their NO and NO2 concentration or NO/NO2 ratio in order in this way to infer the efficiency of the oxidation catalyst and/or of the particulate filter and/or of the ammonia slip catalyst.

Here, the signal value of the first NOx sensor than preferably delivers the "correct" NOx signal value or NOx signal value less affected by NO2 and/or NH3 as compared with the NOx signal value of the second NOx sensor. This first NOx signal value acquired by the first NOx sensor is then used in the control unit, with reference also to the second NOx signal value acquired by the second NO sensor, as a basis for calculating the NO and NO2 concentration and/or the NO/NO2 ratio of the exhaust gas flow in the region of the second NOx sensor and/or downstream of the reduction catalyst or downstream of the ammonia storage catalyst. These values can then be compared with stored desired values, for example, as already described above.

According to a particularly preferred embodiment, it is envisaged that, at defined times, in defined operating states of the internal combustion engine or in defined operating states of the exhaust gas purification device, at or in which efficiency determination (diagnosis) is to take place, the reducing agent supply, i.e., the supply of a metered quantity of reducing agent required per se for the current operating state, is at least reduced, in particular completely shut of for a specified period of time, in particular for the duration of efficiency determination. Additionally or alternatively, a reducing agent store of the reduction catalyst, in particular an ammonia store of an SCR catalyst as a reduction catalyst, is emptied. It is thereby advantageously possible to eliminate the influencing of efficiency determination for the oxidation catalyst and/or the particulate filter and/or an ammonia slip catalyst by the NOx conversion in the reduction catalyst.

This means, in other words, that in the preferred solution according to the invention the two NOx sensor signal values are used in the control unit to calculate the NO and NO2 concentration or at least the NO/NO2 ratio in the exhaust gas flow after the at least one reduction catalyst or after the at least one ammonia slip catalyst or in the region of the measurement position of the second NOx sensor. Owing to the use of just two sensors, it is, in particular, a precondition for particularly informative results that no NOx reduction should take place at the reduction catalyst or SCR catalyst for the duration of the diagnosis. Accordingly, the metering of reducing agent should be shut off temporarily and the reducing agent store of the reduction catalyst, in particular an ammonia store of an SCR catalyst, should be emptied for diagnosis.

At this point, it may furthermore be mentioned that, where an NO/NO2 ratio is to be determined, the NO2/NO ratio can of course be determined instead of the NO/NO2 ratio.

As a particularly preferred option, evaluation of the signal values of the two NOx sensors can be carried out during steady-state operation of the internal combustion engine, in particular during stationary regeneration and/or during service intervals. In this case, checking can be performed before and after stationary regeneration and/or after a sufficient time interval, for example; the latter being chosen to ensure that the reducing agent or NH3 store in the reduction catalyst or SCR catalyst has been emptied by operation and that distortion of the signal is excluded.

In an advantageous embodiment of the invention, the actual signal values of the two NOx sensors and/or the NO and NO2 concentrations and/or NO/NO2 ratios determined on the basis of the actual signal values of the two NOx sensors can be stored as desired values in the electronic control unit in the new state of the exhaust gas purification device and can be compared with the respectively acquired and/or determined actual values during the operation of the internal combustion engine, wherein learning values are adapted and/or an indication or fault signal is generated in the case of defined deviations of the actual values from the stored desired values.

As an alternative, the desired signal values of the two NOx sensors can be stored as a characteristic map in the electronic control unit. This embodiment is suitable especially when checking of the exhaust gas purification device at intervals during non-steady or transient engine operation in the motor vehicle is to be allowed.

The desired values of the two NOx sensors can furthermore be determined by calculation, especially when the exact specifications of the NOx sensors are known and the cross sensitivity thereof to NO2 is appropriately delimited, if appropriate by measurements in defined operating states or exhaust gas concentrations.

It is furthermore advantageously possible for the degree of deviation of the actual signal values from the desired values to be measured and used to characterize the degree of ageing and/or the degree of sulphur contamination of the oxidation catalyst and/or of the particulate filter and/or of the ammonia slip catalyst. This results in further refinement of signal evaluation, with the advantage that it may be possible to deduce reasons for the decreasing conversion rate of the oxidation catalyst and/or of the particulate filter and/or of the ammonia slip catalyst.

In particular, the apparatus according to the invention is characterized in that the control unit comprises an evaluation device, by means of which the NO and NO2 concentration and/or the NO/NO2 ratio of the exhaust gas flow in the region of the second NOx sensor and/or downstream of the reduction catalyst and/or downstream of an ammonia slip catalyst arranged after the reduction catalyst can be determined solely on the basis of the actual signal values of the two NOx sensors. Furthermore, the NO and NO2 concentrations determined in this way and/or the NO/NO2 ratio determined in this way can be compared with one another and/or with specified desired values in order to determine an efficiency of the oxidation catalyst and/or of the particulate filter and/or of an ammonia slip catalyst. The resulting advantages have already been explained in detail above.

The use of NOx sensors which have an NO2 cross sensitivity that differs significantly from the NO cross sensitivity, in particular at least 90%, preferably about 75 to 90%, as first and second NOx sensors is particularly advantageous (also in conjunction with the methodology according to the invention). This means that the measurement signal acquired with the NOx signal in the absence of NH3, e.g. in the case where a preferred NO2 cross sensitivity of 80% is assumed in or by the engine control unit, is made up as follows:

$$NOx\_Sens = NO + 0.8 NO2$$

Finally, a motor vehicle, in particular a commercial vehicle, having a diesel internal combustion engine, an exhaust gas purification device and an electronic control unit in accordance with the above statements is proposed.

BRIEF DESCRIPTION OF THE DRAWINGS

An illustrative embodiment of the invention is described in greater detail below by means of the attached block diagram, which shows an internal combustion engine having an exhaust gas purification device and two NOx sensors connected to an electronic control unit.

DETAILED DESCRIPTION OF THE PREFERRED EMBODIMENTS

In simplified form, the single FIG. 1 shows a diesel internal combustion engine 1 for a commercial vehicle, having an exhaust system 2, in which an oxidation catalyst 3 (DOC), a diesel particulate filter 4 (cDPF) and a reduction catalyst 5 (SCR) and, if appropriate, an ammonia slip catalyst 11 arranged after the reduction catalyst 5 are provided in the direction of flow of the exhaust gas as an exhaust gas purification device. NO is oxidized to NO2 both in the oxidation catalyst 3 and in the diesel particulate filter 4 as well as in the reduction catalyst 5.

Upstream of the oxidation catalyst 3 there is an NOx sensor 7 and, downstream of the reduction catalyst 5 or ammonia slip catalyst 11, there is an NOx sensor 8 inserted into the exhaust line 6, by means of which, in particular, the concentration of NO in the exhaust gas is to be measured and which, in the present case, both have a defined or particular NO2 cross sensitivity, allowing the exhaust gas concentrations of NO and NO2 to be measured by means of the NOx sensors 7, 8 in the exhaust gas flow and fed as signal values to an electronic engine control unit 9.

The control unit 9 is furthermore used to control a metering device 10, by means of which reducing agent, in the form of an aqueous urea solution for example, is metered into the exhaust gas upstream of the reduction catalyst 5.

The NOx sensor 7 positioned upstream of the oxidation catalyst 3 detects the untreated emissions from the diesel internal combustion engine, which have a high NO concentration and low NO2 levels by the nature of the system (excess of air).

The NO concentration is subject to oxidation in the oxidation catalyst 3 and in the particulate filter 4, as well as in the ammonia slip catalyst 11 where present, the following reaction taking place:

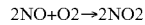

$$2NO + O_2 \rightarrow 2NO_2$$

The second NOx sensor 8 detects the purified emissions after the addition of the reducing agent and the thermolysis or hydrolysis thereof in the hot exhaust gas to form NH3 with corresponding reduction of the NOx in the reduction catalyst 5.

As a departure from the hitherto described conversion of the exhaust components, the control unit 9 is parameterized in such a way that, to control the diagnosis of the oxidizing exhaust gas purification devices or the oxidation catalyst 3 and the particulate filter 4, the quantity of reducing agent supplied by the metering device 10 is selectively reduced or preferably completely interrupted as a first step.

After the interruption of the reducing agent supply, a defined, in particular short period of time, during which the NH3 store or reduction catalyst 5 is emptied or run down to empty, is allowed to elapse, after which the actual signal values of the two NOx sensors 7, 8 are acquired and fed to an evaluation device of the control unit 9, wherein the signal value of the first NOx sensor delivers the "correct" NOx value since it is least affected by NO2 and NH3. This first NOx signal value acquired by the first NOx sensor 7 is then used in the control unit 9, while also referring to the second NOx signal value acquired by the second NOx sensor 5, as a basis for calculating the NO and NO2 concentrations or the NO/NO2 ratio of the exhaust gas flow in the region of the second NOx sensor 8 or downstream of the reduction catalyst 5 or downstream of the ammonia slip catalyst 11. These values can then be compared with stored desired values, for example. For example, it is possible for a difference to be formed between the values determined, and for the value of the difference to be compared with a specified desired value. As an alternative, it is also possible for the respectively determined actual values to be compared with desired values and then for a relevant or irrelevant deviation from a (possibly additional) desired value to be inferred on the basis of the individual deviations or on the basis of the deviations which have been placed in relation to one another. Here, the possibilities for evaluation are numerous and are known per se to a person skilled in the art. Given the detection of a defined deviation of the actual value(s) determined from at least one desired value, a readable fault memory can then be set and/or an indication or fault signal can be generated and/or learning values can be adapted.

Owing to the interruption in the supply of reducing agent to the reduction catalyst 5, no reduction of the NOx concentration in the exhaust gas takes place in said catalyst. Consequently, it is advantageously possible, by comparing the actual signal values of the two NOx sensors 7, 8 with desired signal values stored in the control unit 9, to determine whether the efficiency of the oxidation catalyst 3 and of the particulate filter 4 and, if appropriate, of the ammonia slip catalyst 11 still meets with the required standard or has decreased to an unacceptable extent, possibly due to ageing or sulphur contamination, and may require replacement of components.

Diagnosis can preferably be carried out under steady-state conditions during servicing work on the commercial vehicle and/or during or after stationary regeneration of the oxidation catalyst 3 and/or of the particulate filter 4 and/or of the ammonia slip catalyst 11 after specified time intervals or kilometers travelled.

It is also conceivable to carry out diagnosis more than once, e.g. before and after stationary regeneration. The NH3 store should be emptied, particularly before stationary regeneration.

The desired signal values of the NOx sensors 7, 8 can be determined empirically by measurements in the new state and stored in the control unit 9 and then appropriately compared with the actual signal values.

As an alternative, it is also possible for a correction value for the NO2 component in the exhaust gas to be determined for the signal values of the NOx sensors 7, 8, this correction value then allowing calculation of the NO2 component and hence allowing conclusions to be drawn on the of of the oxidation catalyst 3 and/or of the particulate filter 4 and/or of the ammonia slip catalyst 11.

Moreover, desired signal values can be stored in a characteristic map memory of the control unit 9 as a function of the operating state of the internal combustion engine 1 and other parameters, said signal values being appropriately compared with the actual signal values of the NOx sensors 7, 8 at defined intervals, especially during servicing work or, if appropriate, in non-steady or transient operation of the internal combustion engine 1 or of the motor vehicle.

Finally, with the actual signal values of the two NOx sensors 7, 8 it may be possible, using previous, possibly empirical, signal evaluations and the characterization thereof, to infer ageing or sulphur contamination of the oxidation catalyst 3 and/or of the particulate filter 4 and/or of an ammonia slip catalyst 11 that may be present by means of appropriate signal difference formation.

By means of the described modification of the control unit 9, it is possible to monitor the efficiency of the oxidation catalyst 3 and of the diesel particulate filter 4 and/or of any ammonia slip catalyst 11 that may be present in the exhaust gas purification device in a functionally reliable manner without additional outlay on construction.

The invention claimed is:

1. A method for determining the efficiency of an exhaust gas purification device of an internal combustion engine, the purification device having at least one of an oxidation catalyst and a particulate filter, a reduction catalyst, a metering device for metered supply of a reducing agent, and a control unit, the method comprising the steps of:
arranging a first NOx sensor upstream of the at least one of an oxidation catalyst and a particulate filter;
arranging a second NOx sensor downstream of the reduction catalyst;

feeding signals from the first NOx sensor and the second NOx sensor to the control unit to specify a feed quantity of the reducing agent;

determining, by the control unit, an efficiency of the at least one of an oxidation catalyst and a particulate filter by determining at least one of an NO2/NO ratio and NO and NO2 concentration of an exhaust gas flow of the internal combustion engine at a measurement zone of the second NOx sensor solely using the signals from the first NOx sensor and the second NOx sensor;

controlling, by the control unit, the metering device to decrease a reducing agent supply for a predetermined period of time, the signals of the first NOx sensor and the second NOx sensor being acquired during the predetermined period of time, wherein the reducing agent supply is a supply of a metered quantity of reducing agent required for a current operating state of the internal combustion engine.

2. The method according to claim 1, wherein the internal combustion engine is a diesel internal combustion engine of a motor vehicle.

3. The method according to claim 1, wherein the step of determining an efficiency of the at least one of an oxidation catalyst and a particulate filter includes determining an NO2 formation efficiency.

4. The method according to claim 1, wherein the purification device further comprises an ammonia slip catalyst arranged downstream of the reduction catalyst, wherein the step of determining at least one of an NO2/NO ratio and the NO and NO2 concentration of the exhaust gas flow is determined at least one of at a measurement zone of the second NOx sensor and downstream of the ammonia slip catalyst.

5. The method according to claim 4, wherein the first NOx sensor delivers a first NOx signal, and the control unit uses the first NOx signal with reference to a second NOx signal from the second NOx sensor for calculating the at least one of an NO2/NO ratio and the NO and NO2 concentration of the exhaust gas flow and downstream of the ammonia slip catalyst.

6. The method according to claim 4, wherein values of the at least one of an NO2/NO ratio and the NO and NO2 concentration of the exhaust gas flow determined by the control unit are compared at least one of with one another and with specified desired values, and the step of determining an efficiency further includes determining an efficiency of the ammonia slip catalyst.

7. The method according to claim 1, wherein the first NOx sensor delivers a first NOx signal, and the control unit uses the first NOx signal with reference to a second NOx signal from the second NOx sensor for calculating the at least one of an NO2/NO ratio and the NO and NO2 concentration of the exhaust gas flow.

8. The method according to claim 1, wherein values of the at least one of an NO2/NO ratio and the NO and NO2 concentration of the exhaust gas flow determined by the control unit are compared at least one of with one another and with specified desired values.

9. The method according to claim 1, wherein the step of controlling the metering device to decrease the reducing agent supply includes completely shutting off the reducing agent supply.

10. The method according to claim 1, further comprising the step of emptying a reducing agent store of the reduction catalyst before acquiring the signals of the first NOx sensor and the second NOx sensor for the step of determining the efficiency.

11. The method according to claim 1, wherein the step of determining an efficiency includes evaluating the signals from the first NOx sensor and the second NOx sensor during steady state operation of the internal combustion engine.

12. The method according to claim 1, further comprising the steps of storing in a new state of the exhaust gas purification device desired values comprising at least one of signal values of the first NOx sensor and the second NOx sensor and the at least one of an NO2/NO ratio and the NO and NO2 concentration of the exhaust gas flow determined based on the signal values of the first NOx sensor and the second NOx sensor in the control unit, and the step of determining an efficiency includes comparing the desired values with determined actual values during operation of the internal combustion engine, and one of adapting learning values and generating an indication of fault signals when the actual values deviate from the desired values by more than a defined deviation.

13. The method according to claim 12, wherein the desired values are stored as a characteristic map in the control unit.

14. The method according to claim 12, further comprising determining desired values of the first NOx sensor and the second NOx sensor by calculation.

15. The method according to claim 12, further comprising measuring a degree of deviation of the actual signal values from the desired values, and using the degree of deviation to characterize at least one of aging and a degree of sulphur contamination of the at least one of an oxidation catalyst and a particulate filter.

16. An apparatus for determining an efficiency of an exhaust gas purification device of an internal combustion engine, the purification device having at least one of an oxidation catalyst, a particulate filter, and an ammonia slip catalyst; a reduction catalyst; a metering device for metered supply of a reducing agent; and a control unit, the apparatus comprising:

a first NOx sensor arranged upstream of at least one of an oxidation catalyst, a particulate filter, and an ammonia slip catalyst;

a second NOx sensor arranged downstream of the reduction catalyst; and the control unit being configured to determine at least one of an NO2/NO ratio and an NO and NO2 concentration of exhaust gas flow at at least one of a measurement zone of the second NOx sensor, downstream of the reduction catalyst, and downstream of the ammonia slip catalyst solely using signals from the first NOx sensor and the second NOx sensor, the control unit being configured to compare the at least one of an NO2/NO ratio and the NO and NO2 concentration of the exhaust gas flow with at least one of one another and specified values to determine an efficiency of at least one of the oxidation catalyst, the particulate filter, and the ammonia slip catalyst, and the control unit being further configured to control the metering device to decrease or interrupt a reducing agent supply for a predetermined period of time, the signals of the first NOx sensor and the second NOx sensor for determining the at least one of an NO2/NO ratio and an NO and NO2 concentration of exhaust gas flow being acquired during the predetermined period of time.

17. The apparatus of claim 16, wherein the first NOx sensor and the second NOx sensor each have an NO2 cross sensitivity of at least 90%.

18. The apparatus of claim 16, wherein the first NOx sensor and the second NOx sensor each have an NO2 cross sensitivity of about 75% to 90%.

19. A motor vehicle having the apparatus of claim 16.

20. The apparatus of claim 16, wherein the control unit is configured to empty a reducing agent store of the reduction catalyst before the signals of the first NOx sensor and the NOx sensor for determining the at least one of an NO2/NO ratio and the NO and NO2 concentration of the exhaust gas flow are acquired.

* * * * *